(12) United States Patent
Ramirez et al.

(10) Patent No.: US 11,454,274 B2
(45) Date of Patent: Sep. 27, 2022

(54) POSITIONING TOOL FOR CIRCULAR LUBRICANT DAM INSERT, AND RELATED METHOD

(71) Applicant: General Electric Company, Schenectady, NY (US)

(72) Inventors: Javier Ramirez, Queretaro (MX); Alfonso Cardenas, Queretaro (MX); Gilbert Scott Reveille, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 553 days.

(21) Appl. No.: 16/701,414

(22) Filed: Dec. 3, 2019

(65) Prior Publication Data

US 2021/0164514 A1 Jun. 3, 2021

(51) Int. Cl.
*B25B 27/28* (2006.01)
*F16C 3/02* (2006.01)

(52) U.S. Cl.
CPC ............... *F16C 3/02* (2013.01); *B25B 27/28* (2013.01); *F16C 2326/06* (2013.01)

(58) Field of Classification Search
CPC ......... Y10T 29/53978; Y10T 29/53913; Y10T 29/53657; Y10T 29/53678; Y10T 29/53909; Y10T 29/53961; F16H 57/023; F16D 2001/103; B25B 27/00; B25B 27/0028; B25B 27/0035; B25B 27/0064; B25B 27/06; B25B 27/14; B25B 27/28; B23P 19/10
See application file for complete search history.

(56) References Cited

U.S. PATENT DOCUMENTS

| | | | | | |
|---|---|---|---|---|---|
| 3,110,095 | A | * | 11/1963 | Peickii | F01L 3/08 29/241 |
| 3,197,216 | A | * | 7/1965 | Jackson | F16J 15/54 277/912 |
| 4,114,897 | A | * | 9/1978 | Bainard | F16D 3/06 277/561 |

(Continued)

FOREIGN PATENT DOCUMENTS

DE 102009038292 A1 8/2010

OTHER PUBLICATIONS

EP Search Report, Application No. EP20204206.5, dated Apr. 15, 2021, pp. 1-8.

*Primary Examiner* — Tyrone V Hall, Jr.
(74) *Attorney, Agent, or Firm* — James Pemrick; Charlotte Wilson; Hoffman Warnick LLC (57) ABSTRACT

A positioning tool for axially positioning a circular lubricant dam insert on a splined drive shaft may include a circular body having an inner surface configured to slide over an outer surface of the splined drive shaft. A first plurality of splines may be positioned on an inner surface of the circular body, the first plurality of splines mating with a second plurality of splines on the outer surface of the splined drive shaft. A depth setting member may be positioned on the circular body that defines an axial extent to which the circular body slides over the outer surface of the splined drive shaft. A position setting element may extend axially from the circular body to contact an axial end of the insert to axially position the insert on the splined drive shaft.

12 Claims, 9 Drawing Sheets

(56) References Cited

U.S. PATENT DOCUMENTS 4,218,813 A * 8/1980 Cather, Jr. .......... B25B 27/0028
                                                                                                29/464
4,815,884 A * 3/1989 Halliday, Jr. ........ F16J 15/3268
                                                                                                403/17

* cited by examiner

POSITIONING TOOL FOR CIRCULAR LUBRICANT DAM INSERT, AND RELATED METHOD

BACKGROUND OF THE INVENTION

The disclosure relates generally to machine fabrication, and more particularly, to a positioning tool for a circular lubricant dam insert, and a related method.

Gear boxes include various shafts that require constant lubrication during operation. One approach to ensure proper lubrication is to provide a lubricant dam insert about one or more drive shafts in the gear box. The lubricant dam insert may be a plastic circular element that includes a number of radial openings therein to retain and/or distribute lubricant, e.g., oil, to a particular location about the drive shaft. The circular lubricant dam insert may include axially extending positioning elements thereon to engage with splines on the drive shaft to circumferentially position the dam insert, but axial positioning can be challenging. Improper axial positioning can lead to poor lubrication and/or breaking of the insert.

BRIEF DESCRIPTION OF THE INVENTION

A first aspect of the disclosure provides a positioning tool for axially positioning a circular lubricant dam insert on a splined drive shaft, the positioning tool comprising: a circular body having an inner surface configured to slide over an outer surface of the splined drive shaft; a first plurality of splines on the inner surface of the circular body, the first plurality of splines configured to mate with a second plurality of splines on the outer surface of the splined drive shaft; a depth setting member positioned on the circular body, the depth setting member defining an axial extent to which the circular body slides over the outer surface of the splined drive shaft; and a position setting element extending axially from the circular body, the position setting element configured to contact an axial end of the circular lubricant dam insert to axially position the circular lubricant dam insert on the splined drive shaft.

A second aspect of the disclosure provides a method of positioning a circular lubricant dam insert on a splined drive shaft, the method comprising: positioning a positioning tool on the splined drive shaft, the positioning tool including: a circular body having an inner surface configured to slide over an outer surface of the splined drive shaft, a first plurality of splines on the inner surface of the circular body, the first plurality of splines configured to axially mate with a second plurality of splines on the outer side of the splined drive shaft during the positioning, a depth setting member positioned on the circular body, the depth setting member defining an axial extent to which the circular body slides over the outer surface of the splined drive shaft during the positioning, and a position setting element extending axially from the circular body, the position setting element configured to contact and axially position the circular lubricant dam insert on the splined drive shaft; positioning the circular lubricant dam insert about the splined drive shaft, ensuring an axial end of the circular lubricant dam insert abuts the position setting element on the positioning tool; permanently fastening the circular lubricant dam insert to the splined drive shaft; and removing the positioning tool.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within an illustrative application of a gear box. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. It is often required to describe parts that are at differing radial positions with regard to a center axis. The term "radial" refers to movement or position perpendicular to an axis, e.g., of a drive shaft. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis, e.g., along a drive shaft. Finally, the term "circumferential" refers to movement or position around an axis, e.g., around a drive shaft. It will be appreciated that such terms may be applied in relation to the center axis of the turbine.

In addition, several descriptive terms may be used regularly herein, as described below. The terms "first," "second," and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides a positioning tool for axially positioning a circular lubricant dam insert on a splined drive shaft. The positioning tool ensures the insert is properly axially positioned on the splined drive shaft while not interfering with circumferential positioning of the insert by circumferential positioning elements on the insert that interact with the splined drive shaft.

Figure 1:
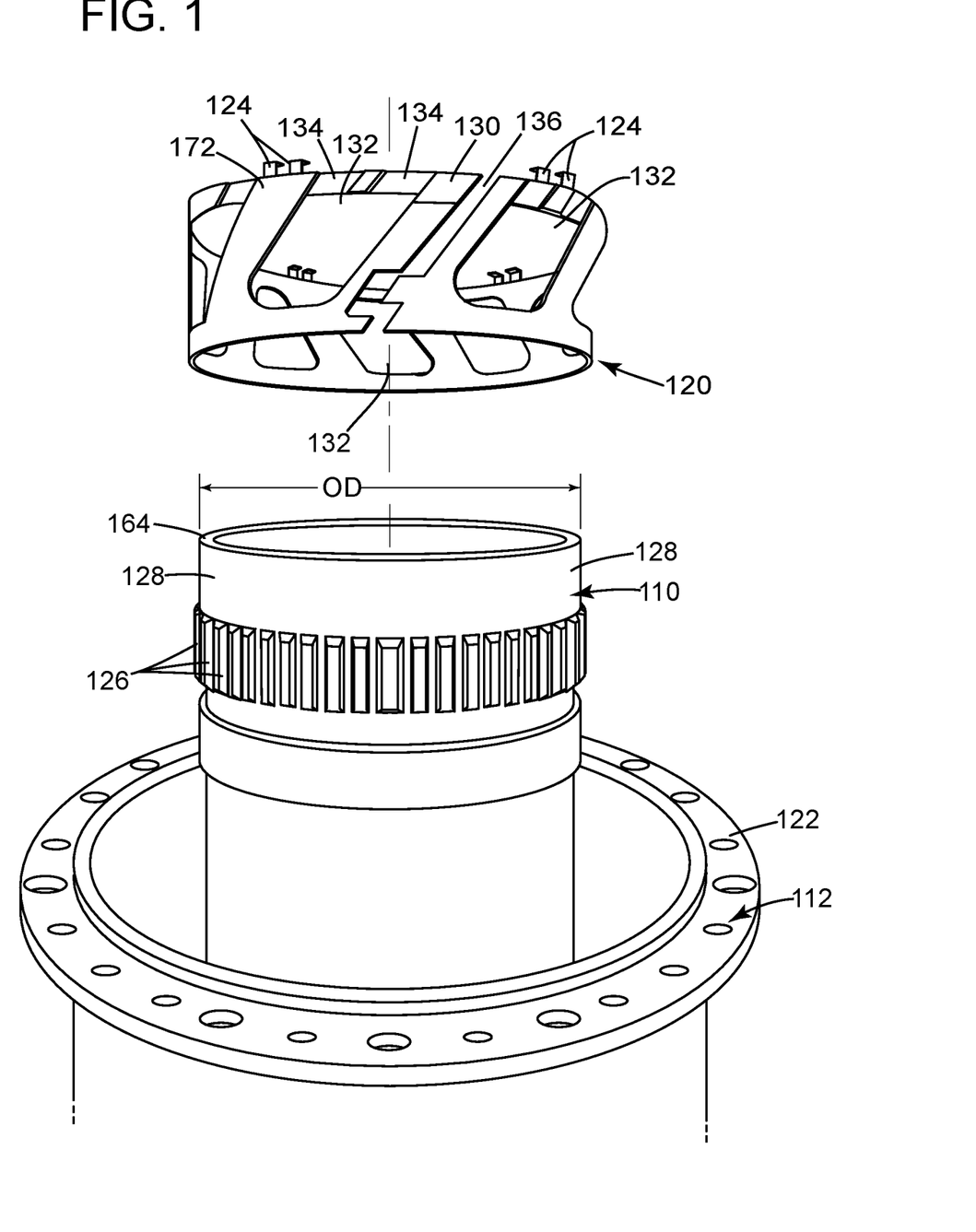
FIG. 1 shows a side exploded view of a circular lubricant dam insert and a splined drive shaft, according to embodiments of the disclosure.

FIG. 1 shows a side exploded view of a splined drive shaft 110 and a circular lubricant dam insert 120 in an illustrative application within a gear box 112. Gear box 112 may include any now known or later developed transmission system including a casing 122 and transfer gears (not shown) therein. As understood, splined drive shaft 110 may be powered to drive one or more other gears (not shown) to transfer rotating power in a direction different than drive shaft 110, e.g., perpendicular to the drive shaft. Casing 122 is sealed to enclose splined drive shaft 110 and other gears, and to provide a lubricant reservoir about the drive shaft and gears. Splined drive shaft 110 may have a circular cross-section; although that may not be necessary in all cases. Splined drive shaft 110 includes a plurality of splines 126 on an outer surface 128 thereof. Splines 126 may interact with gears (not shown) in gear box 112 to transmit power. While shown in the illustrative application of a gear box, it is recognized that the teachings of the disclosure may be applied to any application in which a circular lubricant dam insert 120 is axially positioned on a splined drive shaft 110.

Circular lubricant dam insert 120 (hereinafter "insert 120") may include any now known or later developed element configured to receive a lubricant, e.g., oil or other lubricating liquid or gas, and to retain and/or distribute the lubricant to a desired location about splined drive shaft 110 (hereinafter "drive shaft 110"). Insert 120 may take any form of circular lubricant dam. In the example shown, insert 120 includes a circular member 130 that is cylindrical, and includes a number of radially extending openings 132 therein. When positioned against drive shaft 110, radially extending openings 132 act as lubricant reservoirs. As illustrated, openings 132 may be angled circumferentially to direct lubricant where desired, and may include lubricant passages 134 therein to further direct lubricant where desired, e.g., to splines 126. Insert 120 may made of, for example, a flexible metal or plastic. Insert 120 may include an axial split 136 therein allowing radial expansion and positioning thereof about drive shaft 110, but this may not be necessary in all cases. Insert 120 may optionally include a circumferential positioning element 124 extending axially from an axial end 172 of insert 120. Circumferential positioning element(s) 124 may seat in a respective spline 126, i.e., spaces between one or more splines 126 of drive shaft 110, to circumferentially position insert 120 relative to drive shaft 110. Any number of circumferential positioning elements 124 may be employed about drive shaft 110, or none can be used (see e.g., FIG. 5). While shown in pairs, they may be in other numbered sets. As understood on the art, insert 120 is axially positioned about drive shaft 110 to provide lubricant where desired. For example, insert 120 may be axially positioned just below splines 126 of drive shaft 110 to ensure lubricant is delivered in a consistent manner to splines 126 and/or any gears that interact therewith. Proper axial positioning of insert 120 aids lubrication and prevents damage to the insert and other structure.

Figure 2:
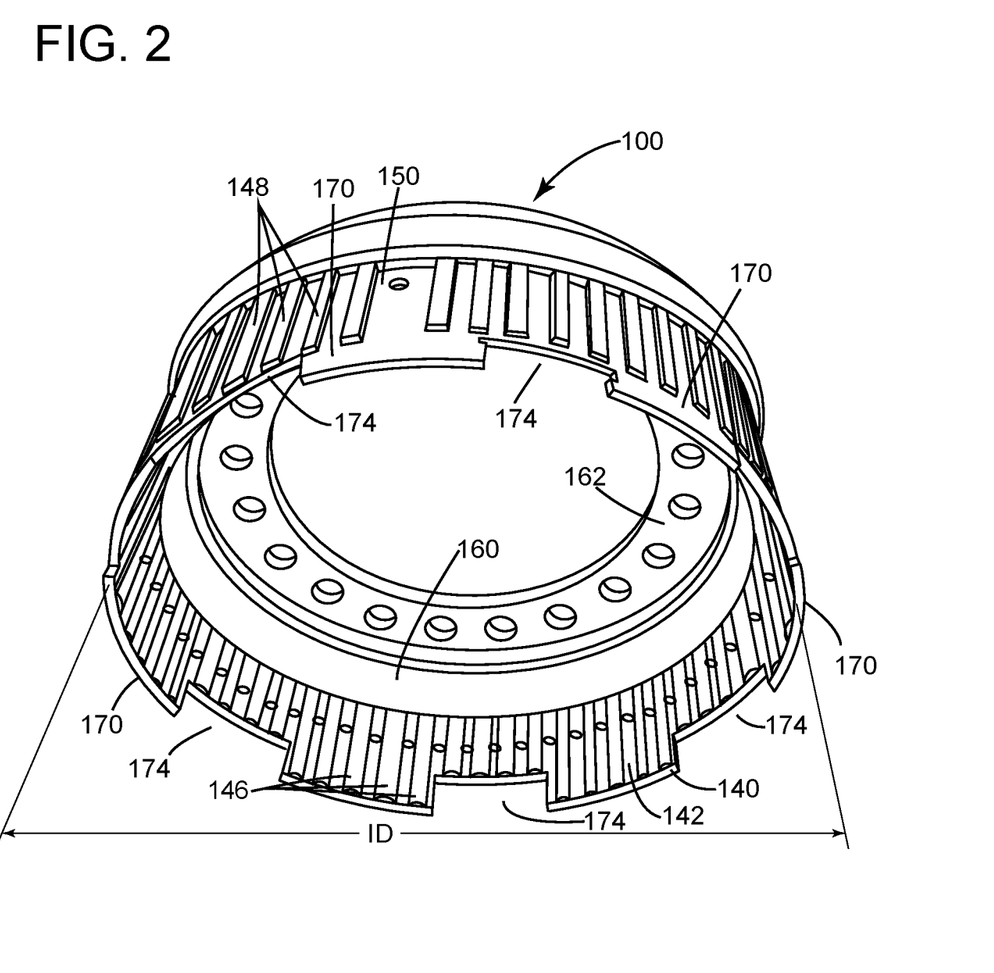
FIG. 2 shows a bottom perspective view of a positioning tool for the insert, according to embodiments of the disclosure.

FIGS. 1 and 2 show a bottom and side perspective view, respectively, of embodiments of a positioning tool 100 according to embodiments of the disclosure. As will be described, positioning tool 100 may axially position insert 120 about drive shaft 110. Positioning tool 100 may include a circular body 140 having an inner surface 142 configured to slide over an outer surface 128 (FIG. 1) of drive shaft 110. Inner surface 142 has an inner diameter ID (FIG. 2) configured to slide over an outer diameter OD (FIG. 1) of outer surface 128.

Figure 3:
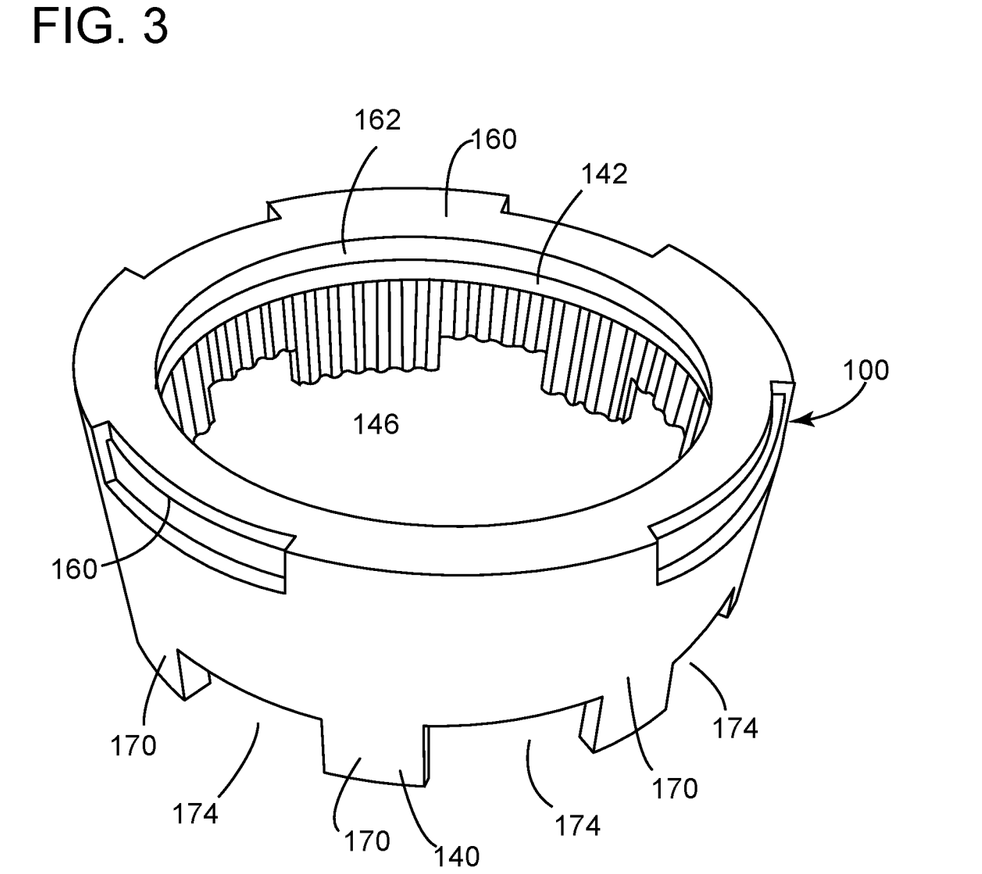
FIG. 3 shows a side perspective view of a positioning tool for the insert, according to other embodiments of the disclosure.

Positioning tool 100 may also include a plurality of splines 146 on inner surface 142 of circular body 140. Splines 146 are configured to mate with splines 126 on outer surface 128 of drive shaft 110. That is, splines 146 may axially slide within spaces between splines 126, and vice versa, during axial movement of positioning tool 100 over drive shaft 110. Consequently, positioning tool 100 and drive shaft 110 are circumferentially coupled when splines 126, 146 interlock. FIG. 2 shows an embodiment in which positioning tool 100 includes splines 148 on an outer surface 150 thereof, while FIG. 3 shows positioning tool 100 with a smooth outer surface. Splines 148 are optional, and do not serve any purpose other than perhaps ease of handling of positioning tool 100.

Positioning tool 100 may also include a depth setting member 160 positioned on circular body 140. Depth setting member 160 may define an axial extent to which circular body 140 slides over outer surface 128 of drive shaft 110. Depth setting member 160 can take the form of any structure that can set the axial extent to which circular body 140 slides over outer surface 128. In FIGS. 2 and 3, depth setting member 160 includes a ledge 162 that extends radially inward from circular body 140 so as to abut an axial end 164 of drive shaft 110 when positioning tool 100 is slid thereover. It will be recognized that depth setting member 160 may include any form of structure on positioning tool 100 that can contact axial end 164 or other structure on drive shaft 110 to define an axial position of positioning tool 100 relative to drive shaft 110.

Positioning tool 100 may also include a position setting element 170 extending axially from circular body 140. Position setting element 170 is configured to contact an axial end 172 (FIG. 1) of insert 120 to axially position insert 120 about drive shaft 110. Position setting element 170 may include any element on or part of circular body 140 capable of contacting axial end 172 of insert 120. Any number of position setting elements 170 may be used. As shown best in FIGS. 2 and 3, each position setting element 170, i.e., an axial end thereof, has a predefined axial distance from depth setting member 160 that defines the proper axial position of axial end 172 of the insert, thus allowing proper axial positioning of insert 120 when axial end 172 abuts position setting element(s) 170.

As will be described in greater detail herein, position setting element 170 may define an axial opening 174 therein to receive any circumferential positioning element(s) 124 extending axially from axial end 172 of insert 120. Each axial opening 174 may extend circumferentially about circular body 140 to any extent required to allow space for circumferential positioning element(s) 124. Any number of position setting element(s) 170 and axial openings 174 may be employed. In this fashion, position setting element 170 may include a plurality of position setting elements 170 arranged in a circumferentially spaced manner about circular body 140 to define a plurality of circumferentially spaced axial openings 174. A circumferential positioning element(s) 124 extending axially from axial end 172 of insert 120 may be positioned in each respective axial opening 174 such that circumferential positioning element(s) 124 may circumferentially position each respective axial opening 174.

Positioning tool 100 may be made of a metal, e.g., a pure metal or metal alloy. The metal may include, for example, aluminum, nickel, or any other rigid metal. In FIG. 2, circular body 140, any optional splines 148 and depth setting member 160 are a unitary metal element, which can be made as a unitary element or may be made with a number components welded together. In FIG. 3, positioning tool 100 is shown as a single unitary piece of plastic. Positioning tool 100 may be made using any now known methods, e.g., casting, machining, welding, additive manufacture, etc.

Figure 4:
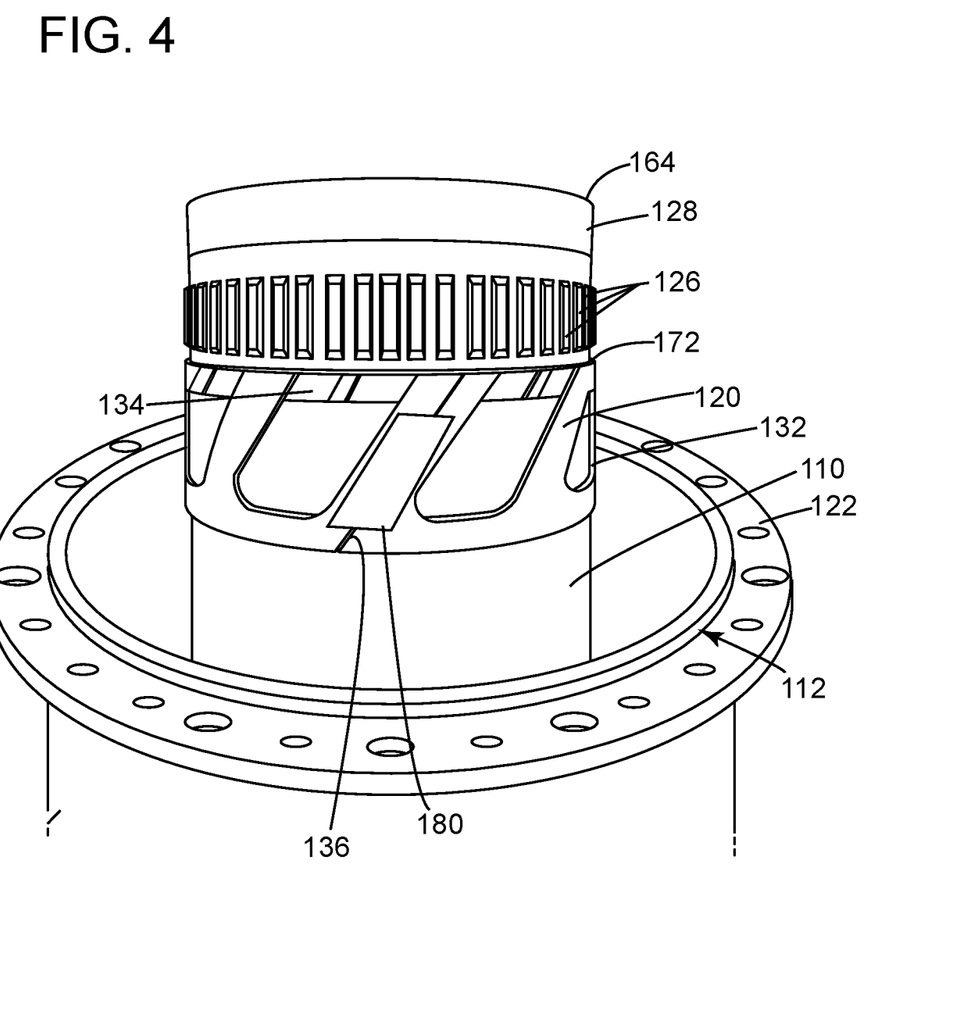
FIG. 4 shows a side view of the circular lubricant dam insert on the splined drive shaft, according to embodiments of the disclosure.
Figure 5:
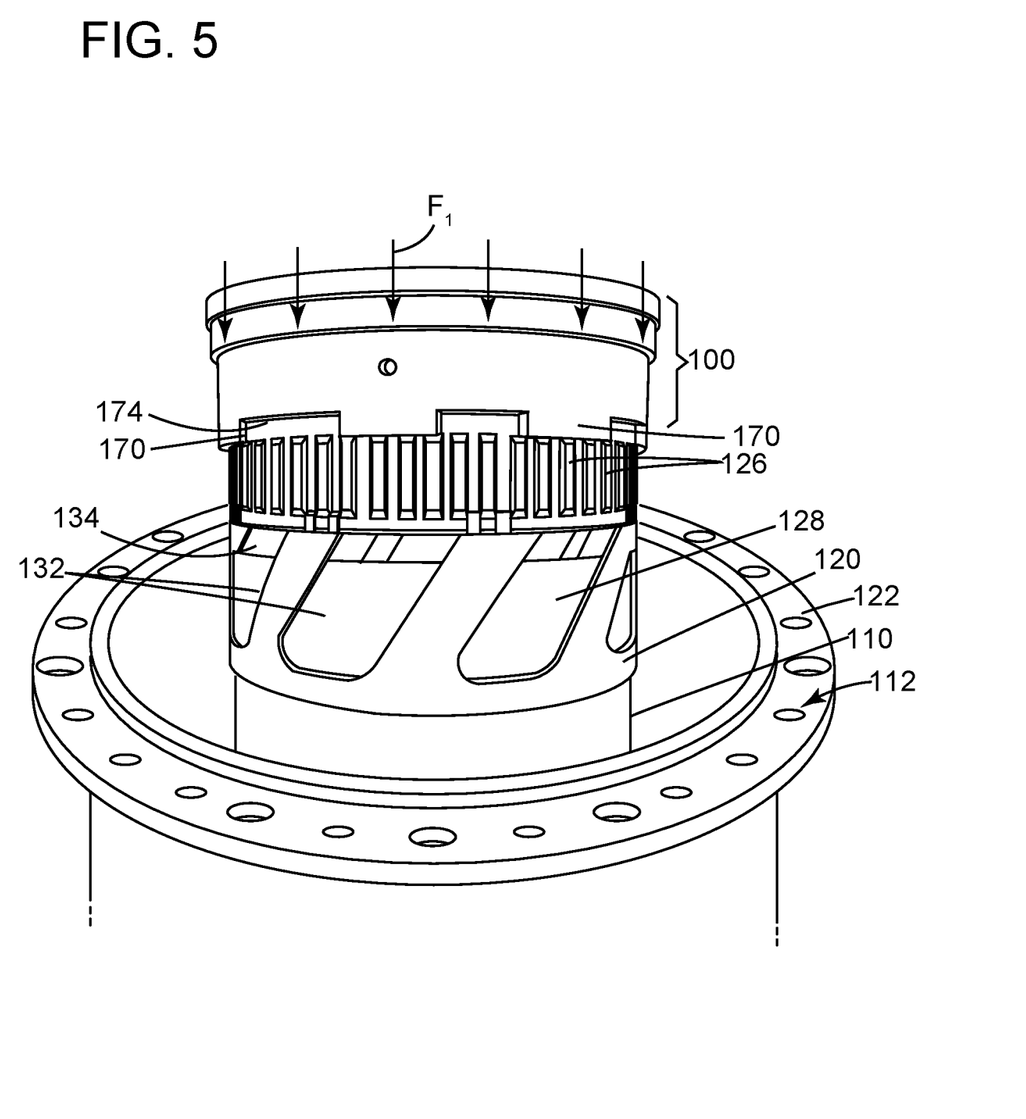
FIG. 5 shows a side view of initial positioning of the positioning tool on the drive shaft, according to embodiments of the disclosure.

Turning to FIGS. 4-9, a method of positioning insert 120 on drive shaft 110 will now be described. The method may include positioning the positioning tool 100 on drive shaft 110 and positioning insert 120 about drive shaft 110. These two operations can happen in any order. The process may be carried out with drive shaft 110 positioned in gear box 112, or separate therefrom. FIG. 4 shows a side view of positioning insert 120 about drive shaft 110, and FIG. 5 shows a side view of initial positioning of positioning tool 100 on drive shaft 110, according to embodiments of the disclosure. Here, insert 120 may be forcibly axially slid over axial end 164 of drive shaft 110 or, where a split 136 is provided therein, it may be temporarily expanded, and placed about a circumference of drive shaft 110. Insert 120 may be positioned in a location close to its desired final axial position. Where desired, insert 120 may be optionally temporarily fastened together and/or in place, e.g., with tape 180 (FIG. 4), plastic ties 188 (FIG. 8) or other temporary fastening mechanism. In the FIG. 4 example, insert 120 does not include circumferential positioning elements 124. In the FIG. 5 example, insert 120 includes circumferential positioning elements 124, which are positioned in splines 126, i.e., spaces between splines 126 to circumferentially position insert 120. In this setting, the insert positioning may further include circumferentially positioning, i.e., by rotating insert 120, circumferential positioning element(s) 124 that extend axially from axial end 172 of insert 120 in a respective one of splines 126 on drive shaft 110, i.e., spaces therebetween. As noted, position setting element 170 includes axial opening 174 therein configured to receive circumferential positioning element(s) 124 on insert 120.

As noted, FIG. 5 shows initial positioning of positioning tool 100 on drive shaft 110. Positioning tool 100 is aligned over drive shaft 110 and forced axially thereover, i.e., with a force F1. Referring to FIG. 2, splines 146 on inner surface 142 are circumferentially positioned to mate with splines 126 on outer surface 128 of drive shaft 110. By circumferentially positioning, i.e., rotating, positioning tool 100 about drive shaft 110 prior to engagement of splines 126 and 146, axial openings 174 in positioning tool 100 can be rotatably positioned to receive circumferential positioning elements 124 extending axially from insert 120 toward positioning tool 100. Once in the desired rotational location, positioning tool 100 can be further axially slid onto drive shaft 110 such that splines 126, 146 engage. At this point, while insert 120 is circumferentially located, it may not be properly axially positioned. Any circumferential positioning elements 124 provided can slide axially in splines 126, leaving insert axially mis-positioned.

Figure 6:
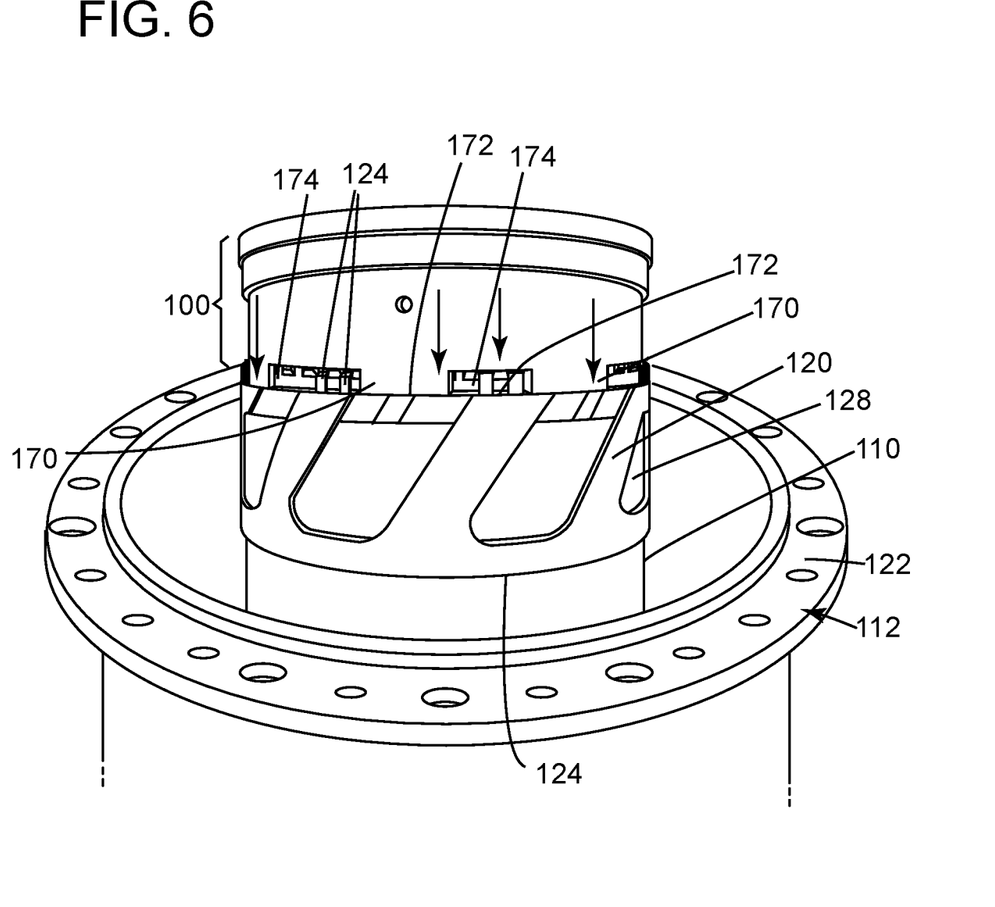
FIG. 6 shows a side view of the positioning tool positioning the insert on the drive shaft, according to embodiments of the disclosure.
Figure 7:
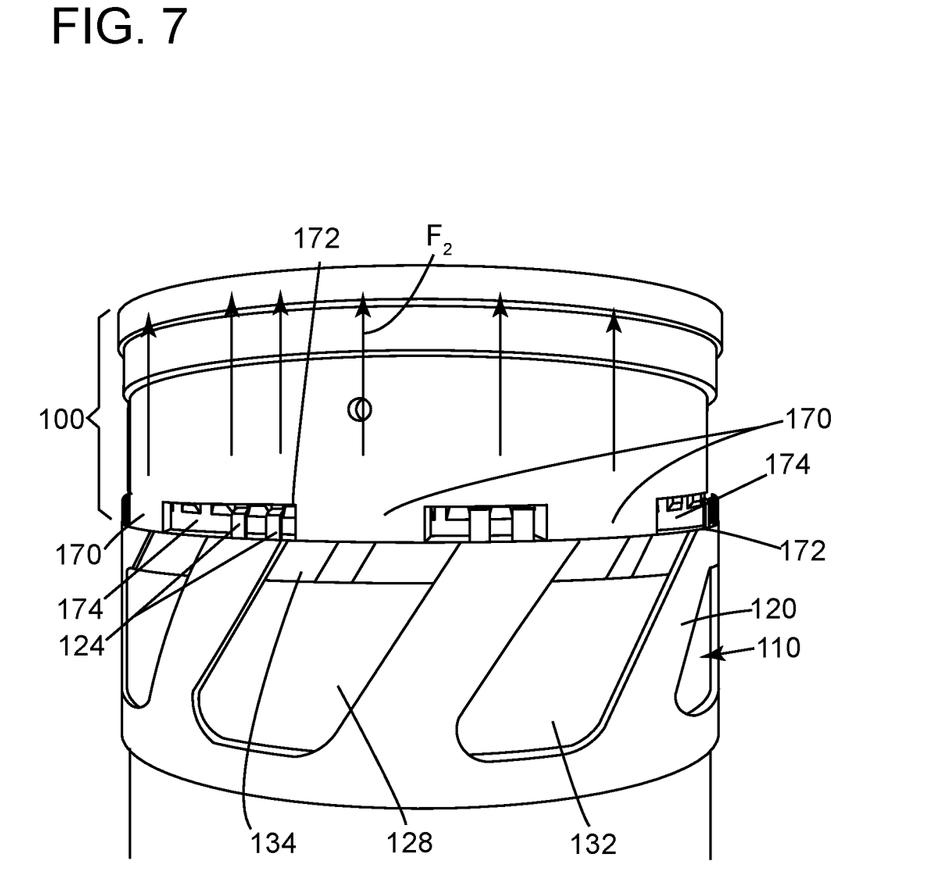
FIG. 7 shows an enlarged side view of the positioning tool positioning the insert on the drive shaft and arrows indicating removal of the positioning tool, according to embodiments of the disclosure.

FIG. 6 shows a side view and FIG. 7 shows an enlarged side view of positioning tool 100 positioning insert 120 on drive shaft 110. As shown in FIG. 6, as positioning tool 100 is further positioned, it continues to slide until depth setting member 160 (FIGS. 2-3) contacts axial end 164 (FIG. 1) of drive shaft 110. In this location, position setting elements 170 are axially in a location at which axial end 172 of insert 120 is to be positioned. A user ensures axial end 172 of insert 120 abuts position setting element 170 on positioning tool 100. Where positioning tool 100 is fully on drive shaft 110, this may occur by forcing axial end 172 of insert 120 against positioning tool 100. Similarly, where positioning tool 100 is not fully on drive shaft 110, it may be further axially slid until depth setting member 160 (FIGS. 2-3) contacts axial end 164 (FIG. 1), and/or axial end 172 of insert 120 may be slid until it abuts position setting element(s) 170 and then depth setting member 160 (FIGS. 2-3) contacts axial end 164 (FIG. 1). In any regard, positioning tool 100 is positioned such that depth setting member 160 is against axial end 164 (FIG. 1) of drive shaft 110, and axial end 172 of insert 120 is abuts position setting element(s) 170, thus properly positioning insert 120.

At this point, a number of different operations can occur including: permanently fastening insert 120 to drive shaft 110, verifying an axial position of insert 120, and/or removing positioning tool 100. The order in which these steps occur can be user-defined.

FIG. 7 also shows arrows indicating removal of positioning tool 100 from drive shaft 110. Positioning tool 100 may be removed by axially pulling, i.e., with a force F2, positioning tool 100 off of drive shaft 110. At this point, insert 120 may be temporarily or permanently fastened in position.

Figure 8:
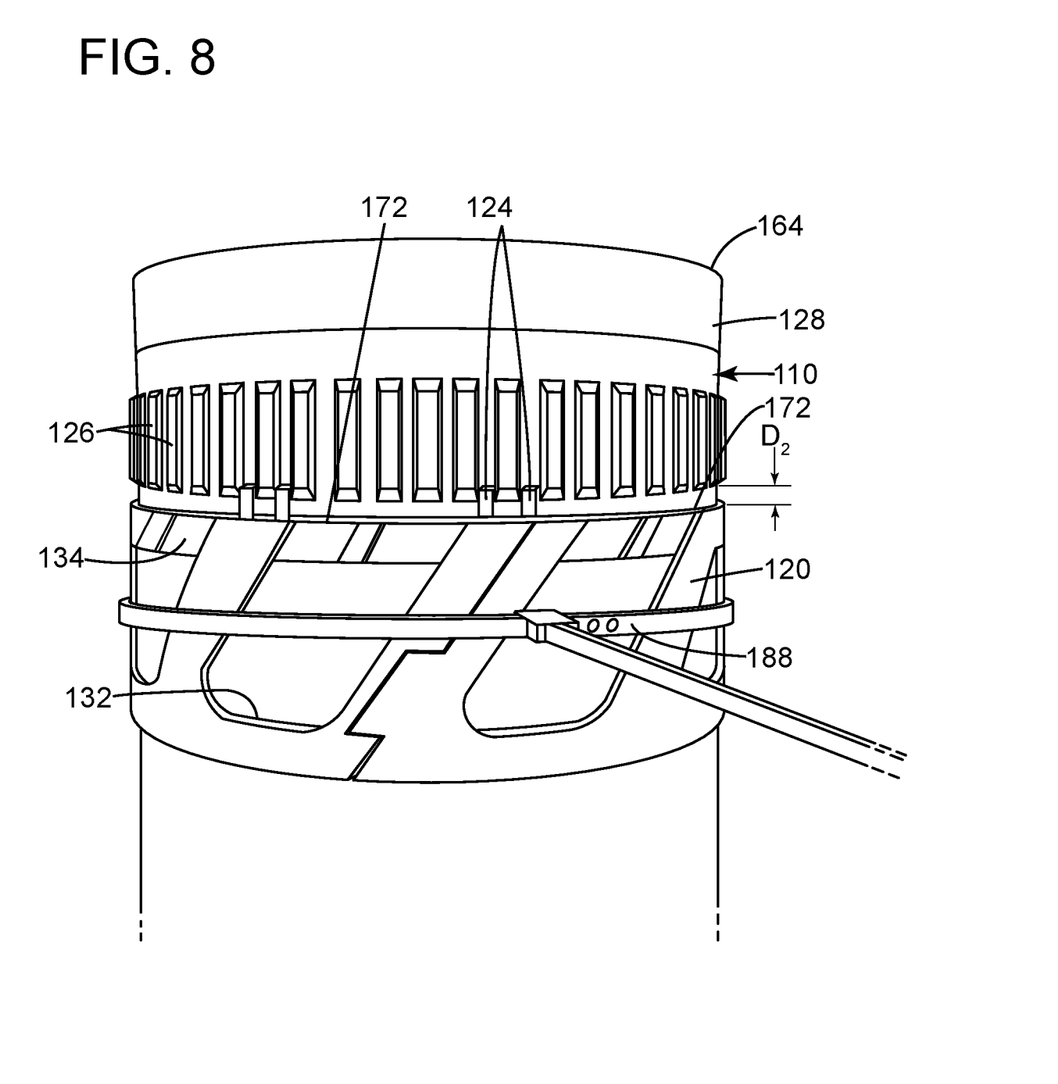
FIG. 8 shows a side view of the insert temporarily fastened on the drive shaft, according to embodiments of the disclosure.

In one embodiment, as shown in the side view of FIG. 8, insert 120 is temporarily fastened to drive shaft 110. Here, prior to permanently fastening insert 120 to drive shaft 110, a distance D2 between axial end 172 of insert 120 and splines 126, i.e., an axial proximate end of splines 126 on drive shaft 110, may be measured to verify a position of insert 120. That is, to verify a desired axial position of insert 120 relative to splines 126 prior to fastening in that location. Here, insert 120 may be temporarily fixed in a location, e.g., by tape, adhesive, and/or fasteners such as plastic ties 188 (shown). In another embodiment, distance D2 between axial end 172 of insert 120 and splines 126 on drive shaft 110 may be measured after permanently fastening insert 120 to drive shaft 110, i.e., to verify a permanent position of insert 120 in a desired axial position thereof relative to splines 126. The measurements can be performed before or after removing positioning tool 100. In any event, the measurement can be carried out using any now known or later developed measurement tool having the desired accuracy, e.g., gauged calipers, measuring tape, optical measurement system, etc. In one non-limiting example, axial end 172 of insert 120 is between 0.457 centimeters (cm) and 0.559 cm (0.180-0.220 inches) from splines 126.

Figure 9:
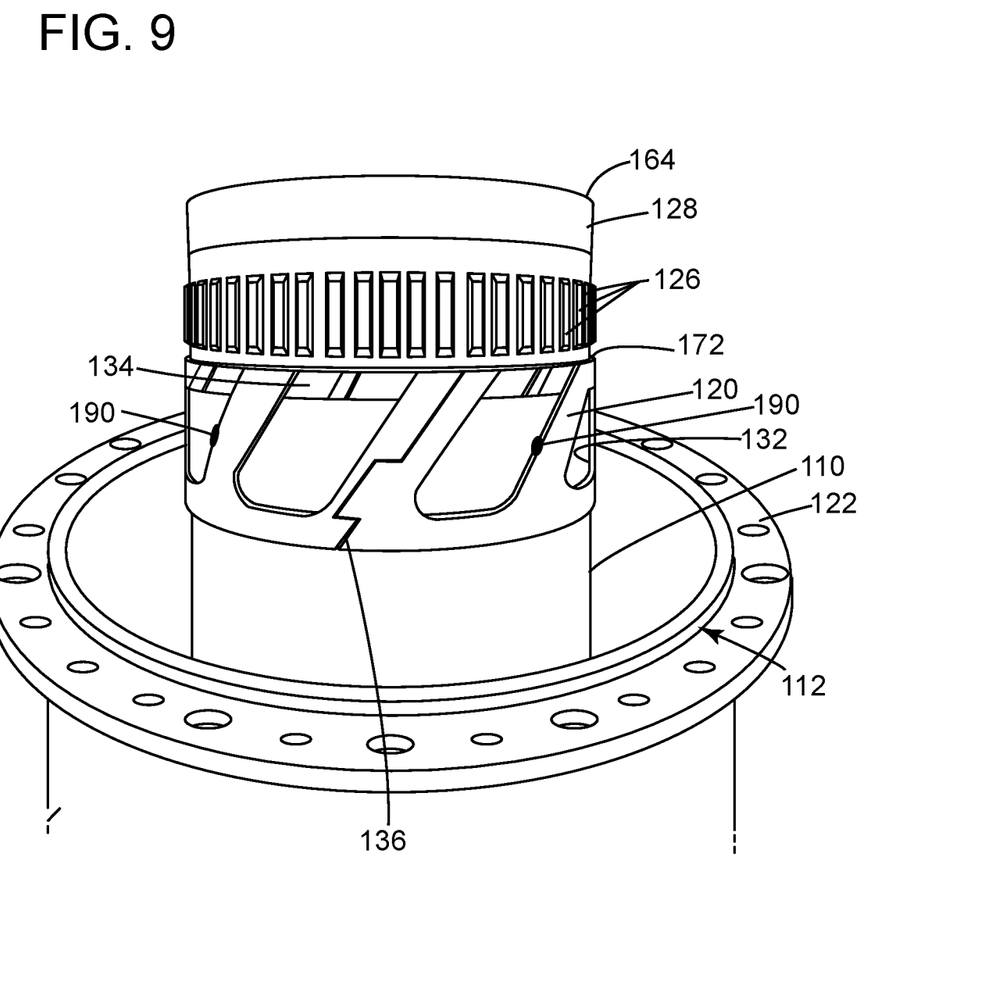
FIG. 9 shows a side view of the insert permanently fastened on the drive shaft, according to embodiments of the disclosure.

FIG. 9 shows a side view of permanently fastening insert 120 to drive shaft 110. The permanent fastening can occur in a number of ways. In one example, insert 120 may be permanently fastened to drive shaft 110 using, for example, an industrial adhesive for a plastic insert 120 or spot welds for a metal insert 120, both indicated by reference numeral 190. It is noted that adhesive may be on insert 120 prior to its positioning on drive shaft 110, and use of positioning tool 100 may occur to position insert 120 in its desired axial location with adhesive already thereon. In another example, insert 120 may be temporarily fastened, as shown in FIG. 8, in position with a temporary fastener, e.g., tape, adhesive, plastic ties 188 (FIG. 8). Then, insert 120 may be permanently adhered to drive shaft 110, e.g., using an industrial adhesive for a plastic insert 120 or spot welds for a metal insert 120. Once complete, any temporary fastener may be removed.

Positioning tool 100 and the related method disclosed provide a mechanism to ensure circular lubricant dam insert 120 is properly axially positioned on splined drive shaft 110 while not interfering with circumferential positioning of the insert by circumferential positioning elements 124 on the insert that interact with the splined drive shaft. Positioning tool 100 is easy and inexpensive to make, and operates relatively quickly.

The foregoing drawings show some of the processing associated according to several embodiments of this disclosure. In this regard, each drawing may represent a process associated with embodiments of the method described. It should also be noted that in some alternative implementations, the acts noted in the drawings may occur out of the order noted in the figure or, for example, may in fact be executed substantially concurrently or in the reverse order, depending upon the act involved.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A positioning tool for axially positioning a circular lubricant dam insert on a splined drive shaft, the positioning tool comprising:
    a circular body having an inner surface configured to slide over an outer surface of the splined drive shaft;
    a first plurality of splines on the inner surface of the circular body, the first plurality of splines configured to mate with a second plurality of splines on the outer surface of the splined drive shaft;
    a depth setting member positioned on the circular body, the depth setting member defining an axial extent to which the circular body slides over the outer surface of the splined drive shaft; and
    a position setting element extending axially from the circular body, the position setting element configured to contact an axial end of the circular lubricant dam insert to axially position the circular lubricant dam insert on the splined drive shaft.

2. The positioning tool of claim 1, wherein the circular body, the first plurality of splines and the depth setting member are a unitary metal element.

3. The positioning tool of claim 1, wherein the position setting element defines an axial opening therein to receive a circumferential positioning element extending axially from the axial end of the circular lubricant dam insert, the circumferential positioning element configured to seat in a respective spline of the second plurality of splines on the splined drive shaft to circumferentially position the circular lubricant dam insert.

4. The positioning tool of claim 3, wherein the position setting element includes a plurality of position setting elements arranged in a circumferentially spaced manner about the circular body to define a plurality of circumferentially spaced axial openings, and wherein the circular lubricant dam insert includes a circumferential positioning element extending axially from the axial end thereof for positioning in each respective axial opening.

5. The positioning tool of claim 1, wherein the splined drive shaft is positioned in a gear box.

6. A method of positioning a circular lubricant dam insert on a splined drive shaft, the method comprising:
- positioning a positioning tool on the splined drive shaft, the positioning tool including:
  - a circular body having an inner surface configured to slide over an outer surface of the splined drive shaft,
  - a first plurality of splines on the inner surface of the circular body, the first plurality of splines configured to axially mate with a second plurality of splines on the outer surface of the splined drive shaft during the positioning,
  - a depth setting member positioned on the circular body, the depth setting member defining an axial extent to which the circular body slides over the outer surface of the splined drive shaft during the positioning, and
  - a position setting element extending axially from the circular body, the position setting element configured to contact and axially position the circular lubricant dam insert on the splined drive shaft;
- positioning the circular lubricant dam insert about the splined drive shaft, ensuring an axial end of the circular lubricant dam insert abuts the position setting element on the positioning tool;
- permanently fastening the circular lubricant dam insert to the splined drive shaft; and
- removing the positioning tool.

7. The method of claim 6, wherein the circular lubricant dam insert positioning further includes circumferentially positioning a circumferential positioning element extending axially from the axial end of the circular lubricant dam insert in a respective one of the second plurality of splines on the splined drive shaft, wherein the position setting element includes an axial opening therein configured to receive the circumferential positioning element.

8. The method of claim 6, further comprising, prior to permanently fastening the circular lubricant dam insert, measuring a distance between the axial end of the circular lubricant dam insert and the second plurality of splines on the splined drive shaft to verify a position of the circular lubricant dam insert.

9. The method of claim 6, further comprising, after permanently fastening the circular lubricant dam insert, measuring a distance between the axial end of the circular lubricant dam insert and the second plurality of splines on the splined drive shaft to verify a position of the circular lubricant dam insert.

10. The method of claim 6, wherein the permanently fastening includes:
- temporarily fastening the circular lubricant dam insert in position with a temporary fastener;
- permanently adhering the circular lubricant dam insert to the splined drive shaft; and
- removing the temporary fastener.

11. The method of claim 6, further comprising, after removing the positioning tool, measuring a distance between the axial end of the circular lubricant dam insert and the second plurality of splines on the splined drive shaft to verify a position of the circular lubricant dam insert.

12. The method of claim 6, wherein the splined drive shaft is positioned in a gear box.

* * * * *